United States Patent
Arita et al.

(10) Patent No.: US 6,898,499 B2
(45) Date of Patent: May 24, 2005

(54) CONTROL SYSTEM

(75) Inventors: Hiroshi Arita, Kobe (JP); Shuuji Kimura, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 130 days.

(21) Appl. No.: 10/211,546

(22) Filed: Aug. 5, 2002

(65) Prior Publication Data

US 2003/0033067 A1 Feb. 13, 2003

(30) Foreign Application Priority Data

Aug. 10, 2001 (JP) .................................... 2001-243493

(51) Int. Cl.⁷ .......................................... G06F 19/00
(52) U.S. Cl. .................... 701/48; 701/35; 701/114; 180/197; 340/616; 123/406.47; 123/478
(58) Field of Search ................ 701/48, 1, 35, 701/114; 123/406.47, 41.14, 478, 491, 142.5 R, 179.21; 180/197; 700/2; 340/616, 618; 307/10.1, 9.1

(56) References Cited

U.S. PATENT DOCUMENTS

| 5,739,761 A | * | 4/1998 | Kobayashi ................. 701/35 |
| 6,082,338 A | * | 7/2000 | Izutani et al. .............. 123/520 |
| 6,243,630 B1 | * | 6/2001 | Oohara et al. ............... 701/35 |
| 2002/0011221 A1 | * | 1/2002 | Suzuki et al. ............ 123/41.14 |
| 2002/0014363 A1 | * | 2/2002 | Kubota et al. ............... 180/197 |
| 2002/0066436 A1 | * | 6/2002 | Majima et al. ........ 123/406.47 |

FOREIGN PATENT DOCUMENTS

JP 2000-081922 3/2000

OTHER PUBLICATIONS

JP 05–060953 translation of claim 1.

* cited by examiner

Primary Examiner—Thomas G. Black
Assistant Examiner—Ronnie Mancho
(74) Attorney, Agent, or Firm—Wenderoth, Lind & Ponack, L.L.P.

(57) ABSTRACT

A control system enables a considerable decrease in electric power consumption of backup power, leading to effective prevention of a dead battery, while data in each control unit which need be maintained even after power is turned off is properly maintained. An ECU has a first transmitter to transmit data which need be maintained to an ECU for storage when a change in position of an IGSW connected to a battery to the off position is detected, and a power supply cutoff circuit to cut off the power supply to the other ECUs after the completion of the transmission of data to the ECU for storage by the first transmitter, wherein the ECU for storage has a first storage controller to store the data transmitted from the other ECUs in RAM, and a power switching circuit to detect the change of the IGSW to the off position and switch the power of the ECU for storage to the backup power.

15 Claims, 11 Drawing Sheets

CONTROL SYSTEM

BACKGROUND OF THE INVENTION

1. Field of the Invention

The present invention relates to a control system and, more particularly, to a control system which enables a reduction in electric power consumption of backup power by making use of data communications between control units.

2. Description of the Relevant Art

In recent years, a lot of ECUs (Electronic Control Units) have been mounted on vehicles for electronic control, and various types of control have been performed. Among these ECUs, an ECU for EFI for performing fuel injection control of an engine, an ECU for ABS for performing drive control of solenoid valves for hydraulic control and the like, an ECU for a transmission for performing drive control of solenoid valves for shifting and the like, an ECU for air bags for controlling spreading of air bag systems, and an ECU for body work for controlling keyless entry and the like are exemplified. The specifications of these ECUs mounted on vehicles very with car models and grades.

Recently, in order to increase the efficiency of control processing between these ECUs and reduce component costs or the like, multiple ECUs have been mutually communicably connected through a communication line so that they can share data of each ECU.

FIG. 11 is a block diagram schematically showing the construction of a control system including conventional ECUs. Reference numeral 60 in the figure represents a control system, which is constituted of ECUs 50a–50f mutually connected through a communication line 12. A vehicular LAN system is constructed of these ECUs 50a–50f.

The ECU 50a comprises an input circuit 2 to perform input processing of signals from a sensor, a switch and the like, a microcomputer 53 to perform various types of computing based on the input signals captured through the input circuit 2, an output circuit 4 to output control signals computed in the microcomputer 53 to an actuator and the like, a power circuit 5 to provide stable power supply voltage to the microcomputer 53, and a communication circuit 6 for data communications through the communication line 12 with the other ECUs 50b–50f.

The microcomputer 53 comprises a CPU 53a, a ROM 53b and a RAM 53c. In accordance with programs previously stored in the ROM 53b, the CPU 53a performs various types of computations based on the input signals captured from the input circuit 2 or data read from the RAM 53c, and stores the computation results in the RAM 53c or outputs them through the output circuit 4 to the actuator.

A battery 8 is connected through a power line 9a and an ignition switch 7 to the power circuit 5. The 12V power from the battery 8 is converted to 5V power in the power circuit 5, and the 5V power is provided to a power terminal 9c of the microcomputer 53 by turning on the ignition switch 7. In addition, the battery 8 is connected through a backup power line 9b without the ignition switch 7 involved to the power circuit 5. Even while the ignition switch 7 is in the off position, a prescribed constant voltage to which power is converted in the power circuit 5 is supplied to the power terminal 9c of the microcomputer 53. The hardware of any of the other ECUs 50b–50f except the ECU 50a, is almost the same as the above.

In the control system 60 having the above construction, when the ignition switch 7 is turned off, each microcomputer 53 in the ECUs 50a–50f is provided with electric power through the backup power line 9b and the power circuit 5 from the battery 8 even during the off state of the ignition switch 7. As a result, even while the ignition switch 7 is in the off position, data stored in the RAM 53c of each microcomputer 53 is not destroyed, so that the ECUs 50a–50f each can maintain required data.

In recent years, the number of ECUs mounted on each vehicle has been larger and larger. Although the electric current consumption for maintaining data stored in RAM is small on a single ECU basis, with an increasing number of ECUs mounted on each vehicle, the electric current consumption for maintaining data per vehicle becomes considerably large.

According to the above conventional method, with an increasing number of ECUs mounted, the electric current consumption, or dark current for maintaining memory contents increases, so that there is a high possibility of an early dead battery being caused in cases where a vehicle is transported or let stand with the battery connected.

Although efforts to decrease the dark current for maintaining memory contents are being made on a single ECU basis, there is a limit to these efforts as long as the basic construction of an ECU is not greatly changed.

There is a method wherein an EEPROM, being a nonvolatile memory which can maintain data even after power supply cutoff, is mounted and part of the data to be stored in RAM is stored in the EEPROM. However, in general, since the capacity of an EEPROM is small, the amount of data which can be written therein is limited. When the capacity thereof is made large, it becomes expensive, resulting in the limited uses thereof.

SUMMARY OF THE INVENTION

The present invention was accomplished in order to solve the above problem, and it is an object of the present invention to provide a control system, which enables a substantial reduction in power consumption of backup power, resulting in effective prevention of a dead battery, while properly maintaining data of each control unit which need be maintained even after the main power is turned off.

In order to achieve the above object, a control system (1) according to the present invention is characterized by being a control system wherein a first control unit and a second control unit perform data communications, the first control unit and the second control unit being capable of sharing data with each other; the first control unit having a first transmitting means to transmit data which need be maintained to the second control unit when a change of a first switch connected to a power source to the off position is detected and a power supply cutoff means to cut off the power supply to the first control unit after the transmission of the data to the second control unit by the first transmitting means is completed; and the second control unit having a first storage controlling means to store the data transmitted from the first control unit in a first storage means and a power switching means to detect a change of the first switch to the off position and switch the power of the second control unit to backup power.

Using the above control system (1), in the first control unit, it is not necessary to change the power to the backup power so as to maintain the data, since the power supply to the first control unit is cut off after the transmission of the data to the second control unit is completed. Therefore, the power supply from the power source can be completely stopped, so that the electric current consumption can be reduced to zero.

And in the second control unit, the change of the first switch to the off position is detected and the power is switched to the backup power, so that the data can be properly kept in storage in the first storage means.

By utilizing the control system wherein data can be shared between control units, it is possible to transmit data which need be maintained during the off state of the first switch, for example, important data such as learned values used for control to the second control unit and allow the data to be stored therein, and then, to cut off the power supply to the first control unit. As a result, the electric current consumption during the off state of the first switch in the overall system including the first and second control units can be considerably reduced. When the power source is a battery, the power consumption of backup power can be substantially reduced, resulting in effective prevention of the occurrence of a dead battery.

A control system (2) according to the present invention is characterized by the first control unit having a first receiving means to receive the data transmitted from the second control unit when a change of the first switch to the on position is detected, and the second control unit having a second transmitting means to transmit the data stored in the first storage means to the first control unit, being a source of the data, when a change of the first switch to the on position is detected in the above control system (1).

Using the above control system (2), when a change of the first switch to the on position is detected, the data stored in the first storage means in the second control unit is transmitted to the first control unit, being the data source. Therefore, the first control unit receives the data as the first switch is turned on, and can return to its normal processing condition.

A control system (3) according to the present invention is characterized by comprising a plurality of the first control units in the above control system (1) or (2).

Using the above control system (3), when a plurality of the first control units are arranged, the number of control units to which the power supply from a power source can be cut off during the off state of the first switch becomes large, so that the effect of reducing the power consumption of backup power in the overall system can be further enhanced.

A control system (4) according to the present invention is characterized by comprising a plurality of the second control units in any of the above control systems (1)–(3).

Using the above control system (4), when a plurality of the second control units are arranged, even if a problem that the data has not been normally stored, or a problem that the data cannot be normally read out, or the like is caused by something abnormal in any of the second control units, it is possible to properly return the first control unit to its normal processing condition with a change of the first switch to the on position, by sending the data stored in another normal second unit to the first control unit for use, resulting in improvements in reliability of the system.

A control system (5) according to the present invention is characterized by the first transmitting means in the first control unit which transmits the data to the second control unit multiple times, the second control unit having a data identifying means to judge whether the multiple transmitted data from the first control unit are identical with one another or not, and the first storage controlling means which stores the data in the first storage means when the data identifying means judges the data to be identical with one another in any of the above control systems (1)–(4).

Using the above control system (5), the data is transmitted from the first control unit to the second control unit multiple times, and whether or not the multiple transmitted data from the first control unit are identical with one another is judged in the second control unit. When each of the data is judged to be the same, the data is stored in the first storage means.

Therefore, it is possible to prevent the data in which an abnormal condition was caused by abnormal communications, garbled data due to noise superposition or the like from being stored in the first storage means. And when the first switch is turned on, the second control unit can send the data of accuracy to the first control unit, and properly return the first control unit to its normal processing condition with a change of the first switch to the on position, resulting in improvements in reliability of the system.

A control system (6) according to the present invention is characterized by the first transmitting means in the first control unit which transmits the data periodically to the second control unit during the on state of the first switch in any of the above control systems (1)–(5).

Using the above control system (6), even if the data stored in the first control unit is destroyed because of a short break of power while the first switch is in the on position, it is possible to capture the data which had been transmitted periodically to the second control unit before the occurrence of the abnormal condition from the second control unit for use. As a result, it is possible to swiftly return the first control unit to its normal processing condition just before the occurrence of the abnormal condition, resulting in improvements in reliability of the system.

A control system (7) according to the present invention is characterized by the first control unit having a second storage means, being nonvolatile, which can maintain data even if power is not supplied, a second storage controlling means to store only a minimum of data required for normal control of the first control unit in the second storage means, and a data reading means to read the data stored in the second storage means as necessary in any of the above control systems (1)–(6).

Using the above control system (7), since a minimum of data required for normal control of the first control unit is stored in the nonvolatile second storage means, even if a problem such as a failure of the second control unit, a break in a communication line or a short break of power occurs, it is possible to read the data as needed to continue the control. Therefore, without resuming the control based on the initial value data, the data stored in the second storage means is read out and used for control in the first control unit, so that it can return to its normal processing condition immediately, resulting in improvements in reliability of the system.

A control system (8) according to the present invention is characterized by the data reading means in the first control unit which reads the data from the second storage means when data to be transmitted from the second control unit upon changing the first switch to the on position cannot be received, and the first control unit having a first used data controlling means to use the data read from the second storage means by the data reading means for control in the above control system (7).

Using the above control system (8), even if the first control unit cannot receive data to be transmitted from the second control unit upon changing the first switch to the on position due to some problem, it is possible to read the data written in the second storage means to use for control, so that it can swiftly return to its normal processing condition just before the occurrence of the abnormal condition, resulting in improvements in reliability of the system.

A control system (9) according to the present invention is characterized by the first control unit having a first announcing means to announce the occurrence of an abnormal condition when data to be transmitted from the second control unit upon changing the first switch to the on position cannot be received in the above control system (8).

Using the above control system (9), when the first control unit cannot receive data to be transmitted from the second control unit upon changing the first switch to the on position, it is possible to announce the occurrence of something abnormal in the state of communications with the second control unit using a warning indicator light, a warning announcement or the like, resulting in the performance of an early inspection.

A control unit (10) according to the present invention is characterized by the data reading means in the first control unit which reads the data from the second storage means upon changing the first switch to the on position, and the first control unit having a data match judging means to judge whether or not the data read from the second storage means by the data reading means matches with the data transmitted from the second control unit, and a second used data controlling means to use the data read from the second storage means for control when the data read from the second storage means and the data transmitted from the second control unit are judged not to match with each other by the data match judging means in the above control system (8).

Using the above control system (10), by judging whether or not the data read from the second storage means matches with the data transmitted from the second control unit, whether or not there is something abnormal in the data transmitted from the second control unit can be judged, so that it is possible to prevent the use of the data in which something abnormal has occurred. When both of the data are judged not to match with each other, the first control unit can use the data on which learning processing had been conducted until the last minute through using the data read from the second storage means for control, so that it can swiftly return to its normal processing condition just before the occurrence of the abnormal condition, resulting in improvements in reliability of the system.

A control system (11) according to the present invention is characterized by the first control unit having a second announcing means to announce the occurrence of an abnormal condition when both of the data are judged not to match with each other by the data match judging means in the above control system (10).

Using the above control system (11), when the data match judging means judges both of the data not to match with each other, the first control unit can announce the occurrence of something abnormal in the state of communications with the second control unit using a warning indicator light, a warning announcement or the like, resulting in the performance of an early inspection.

A control system (12) according to the present invention is characterized by the first control unit having an alternative data reading means to read a prescribed value stored as a fail safe value when data which has not been written in the second storage means is required for control in any of the above control systems (7)–(11).

Using the above control system (12), when the first control unit requires data which has not been written in the second storage means for control, the prescribed value stored as a fail safe value can be read out to be used for control.

For example, when the second storage means is an EEPROM, the capacity thereof is limited, so that data which cannot be stored in EEPROM is previously stored as fail safe values in ROM. The fail safe values stored in ROM are not initial values of each datum, but estimated values which are updated through a measure of learning processing. By using such fail safe values for control, the learning processing of other data which cannot be stored in EEPROM due to a small capacity thereof is not wasted, and by substituting fail safe values as estimated values updated by learning processing, it is possible to allow the first control unit to swiftly return to the condition close to its normal processing condition just before an abnormal condition occurred, resulting in improvements in reliability of the system.

A control system (13) according to the present invention is characterized by being mounted on a vehicle, wherein the second control unit is an ECU for body control or that for security in any of the above control systems (1)–(12).

Using the above control system (13), in general, compared with in a case where an ECU which need not function during the off state of an ignition is set as the second control unit, in a case where the ECU for body control or that for security which need operate even during the off state of the ignition, being in a standby status so that it can operate at any time even after the ignition is turned off, is set as the second control unit, the power consumption of backup power during the off state of the ignition in the overall system can be efficiently reduced, resulting in effective prevention of the occurrence of a dead battery.

A control system (14) according to the present invention is characterized by being mounted on a vehicle, wherein, in the case of a plurality of the second control units being arranged, an ECU for engine control is included in the second control units in the above control system (13).

Using the above control system (14), when a plurality of the second control units are arranged, by using the ECU for engine control which is mounted on any type of vehicles without exception as the second control unit, compared with an ECU which is mounted or not mounted depending on vehicle type, the specifications are made uniform without an increased variety of system constructions, resulting in holding down a rise in cost of the system construction.

A control system (15) according to the present invention is characterized by a control system wherein multiple control units can mutually perform data communications, comprising at least one control unit among multiple control units having a nonvolatile storage means which can maintain the memory contents using backup power, wherein the other control units transmit the memory contents which need be maintained to the control unit having the nonvolatile storage means when the power supply to the system is shut off.

Using the above control system (15), when the power supply to the system is shut off, the memory contents which need be maintained in the other control units are stored in the nonvolatile storage means. Therefore, the other control units need not maintain the memory contents using backup power, so that the power supply to the other control units can be completely stopped, resulting in zero electric current consumption. And the control unit having the nonvolatile storage means can maintain the memory contents using backup power. Therefore, when the power supply to the system is shut off, the electric current consumption in the overall system including the multiple control units can be considerably reduced. When the power source is a battery, the power consumption of backup power is considerably reduced, resulting in effective prevention of the occurrence of a dead battery.

DESCRIPTION OF THE PREFERRED EMBODIMENTS

Figure 1:
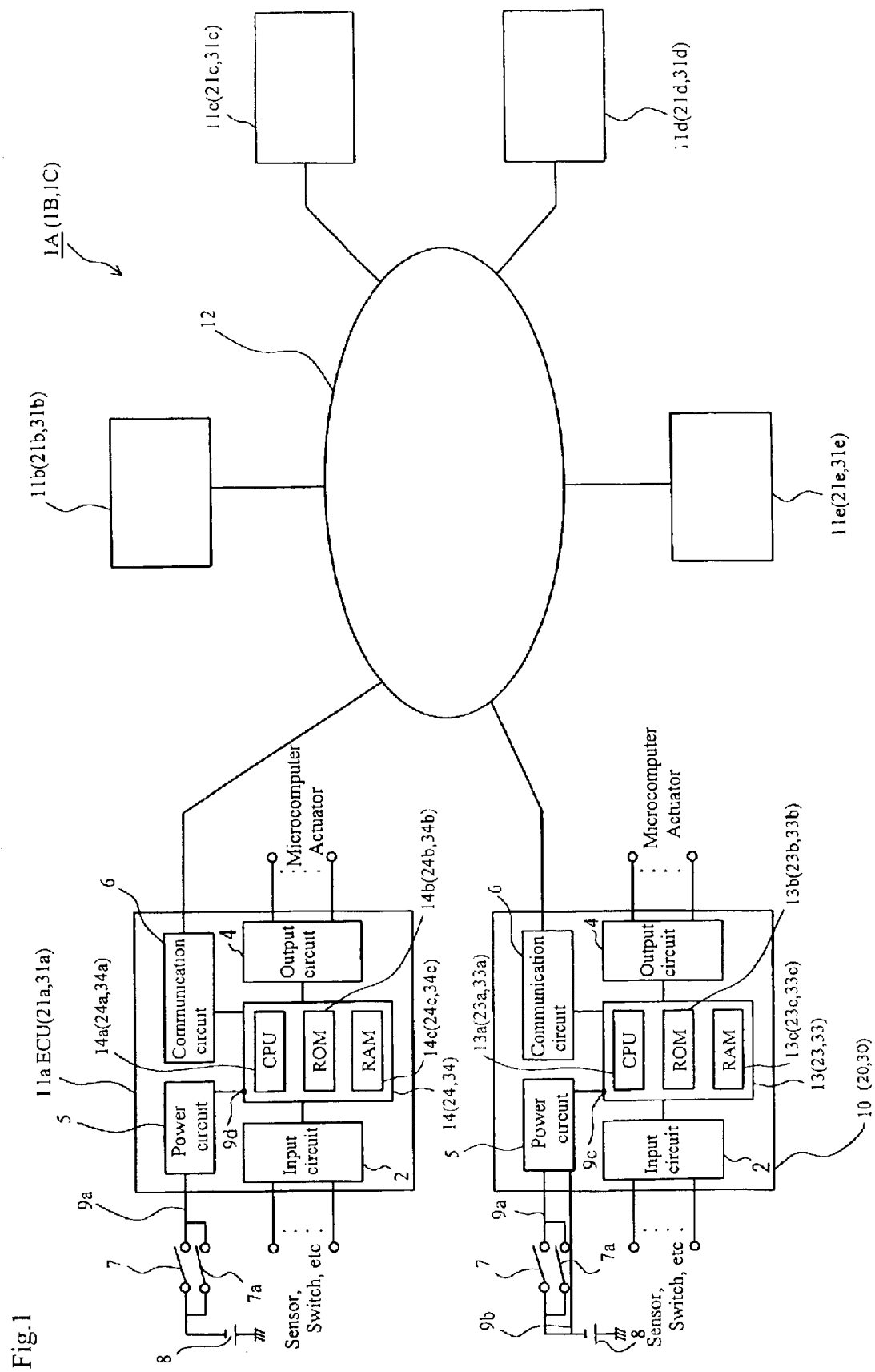
FIG. 1 is a block diagram schematically showing the construction of a control system including ECUs according to an embodiment (1) of the present invention.

Preferred embodiments of a control system including ECUs according to the present invention are described below by reference to those Figures. FIG. 1 is a block diagram schematically showing the construction of a control system according to an embodiment (1) of the present invention. Here, the components having the same functions as those of the control system 60 shown in FIG. 1 are similarly marked, which are not described below.

Reference numeral 1A in the figure represents a control system, being constructed by connecting an ECU for storage 10 through a communication line 12 with each of the other ECUs 11a–11e so that data can be shared therebetween, which is a vehicular LAN system.

As the ECU for storage 10, an ECU which is required to be continuously supplied with electric power from a battery 8 to be on standby so that it can operate as necessary even after an ignition switch 7 is turned off, has been adopted. For example, an ECU for body control which performs control for remote control of door's lock/unlock, control of power windows and the like, an ECU for security which performs control of security systems such as a theft-prevention measure, or the like has been adopted.

As the other ECUs 11a–11e, ECUs which need not operate after the ignition switch 7 is turned off have been adopted. For example, an ECU for EFI (fuel injection control) which performs drive control of an injector, an igniter, an idle speed control stepper motor and the like, an ECU for ABS which performs drive control of solenoid valves for hydraulic control and the like, an ECU for air bags which controls spreading of air bags, an ECU for air conditioning which controls an air conditioner, and the like can be adopted.

The ECU for storage 10 comprises an input circuit 2 to perform input processing of signals from a sensor, a switch and the like, a microcomputer 13 comprising a CPU 13a for performing various types of computing by capturing the signals from the input circuit 2, a ROM 13b and a RAM 13c, an output circuit 4 to perform signal output processing for driving an actuator based on the control signals computed in the microcomputer 13, a communication circuit 6 to perform processing for data communications with the other ECUs 11a–11e connected through the communication line 12, and a power circuit 5 for supplying stable electric power required for operations of the microcomputer 13 and the like.

The power circuit 5 is constructed so as to supply stable electricity of a constant voltage required for operations of the microcomputer 13 to a power terminal 9c. The power circuit 5 is connected through a backup power line 9b with the battery 8 so that a prescribed voltage can be applied to the power terminal 9c even during the off state of the ignition switch 7. Even if the ignition switch 7 is in the off position, the memory of the RAM 13c of the microcomputer 13 is backed up so as not to be destroyed.

Moreover, to the power circuit 5, the battery 8 is connected through a relay switch 7a connected in parallel with the ignition switch 7. After the ignition switch 7 is turned off, the relay switch 7a is turned off at a predetermined timing.

The hardware of the ECU 11a is almost the same as that of the ECU for storage 10, and the difference between them is that the ECU for storage 10 is connected through the backup power line 9b with the battery 8 so as to maintain data of the RAM 13c even if the ignition switch 7 is turned off, while in the ECU 11a, after the ignition switch 7 is turned off, the relay switch 7a is turned off at a predetermined timing, so that the power supply from the battery 8 to a microcomputer 14 is cut off. Here, different marks are affixed to only the microcomputers having different functions for descriptions, and the other components are not described below.

Each hardware of the other ECUs 11b–11e is almost the same as that of the ECU 11a. After the ignition switch 7 is turned off, the relay switch 7a is turned off at a predetermined timing, so that the power supply to each microcomputer is cut off.

The ECU for storage 10 and each of the ECUs 11a–11e capture input signals from the sensor, switch and the like so as to perform various types of control processing to the actuator and the like, based on each control program previously stored in the ROM 13b, 14b, . . . of the microcomputer 13, 14, . . . , respectively, while by performing communications of data required for control with the other ECUs through the communication line 12 as necessary, the vehicle conditions are properly controlled.

As a communication access method of the ECU for storage 10 with each of the ECUs 11a–11e, both being connected through the communication line 12, various kinds of methods such as a CSMA/CD method, a token passing method, a master-slave method, or a TDMA method can be adopted. For example, if the CSMA/CD method is adopted, any of the ECUs 11a–11e transmitting data sends the data to which a destination address and a source address are added into the communication line 12, and the ECU for storage 10 connected through the communication line 12 therewith judges from the destination address whether the destination of the sent data is the ECU for storage 10 itself or not, and if the destination is the ECU for storage 10 itself, it captures the data.

The outlines of the processing operations performed by the microcomputer 13 of the ECU for storage 10 and the microcomputer 14, . . . of each of the ECUs 11a–11e, which constitute the control system according to the embodiment (1), are described below by reference to a timing chart showing changes in supply voltage to each of the ECUs 11a–11e with the on/off operation of the ignition switch 7 shown in FIG. 2.

Figure 2:
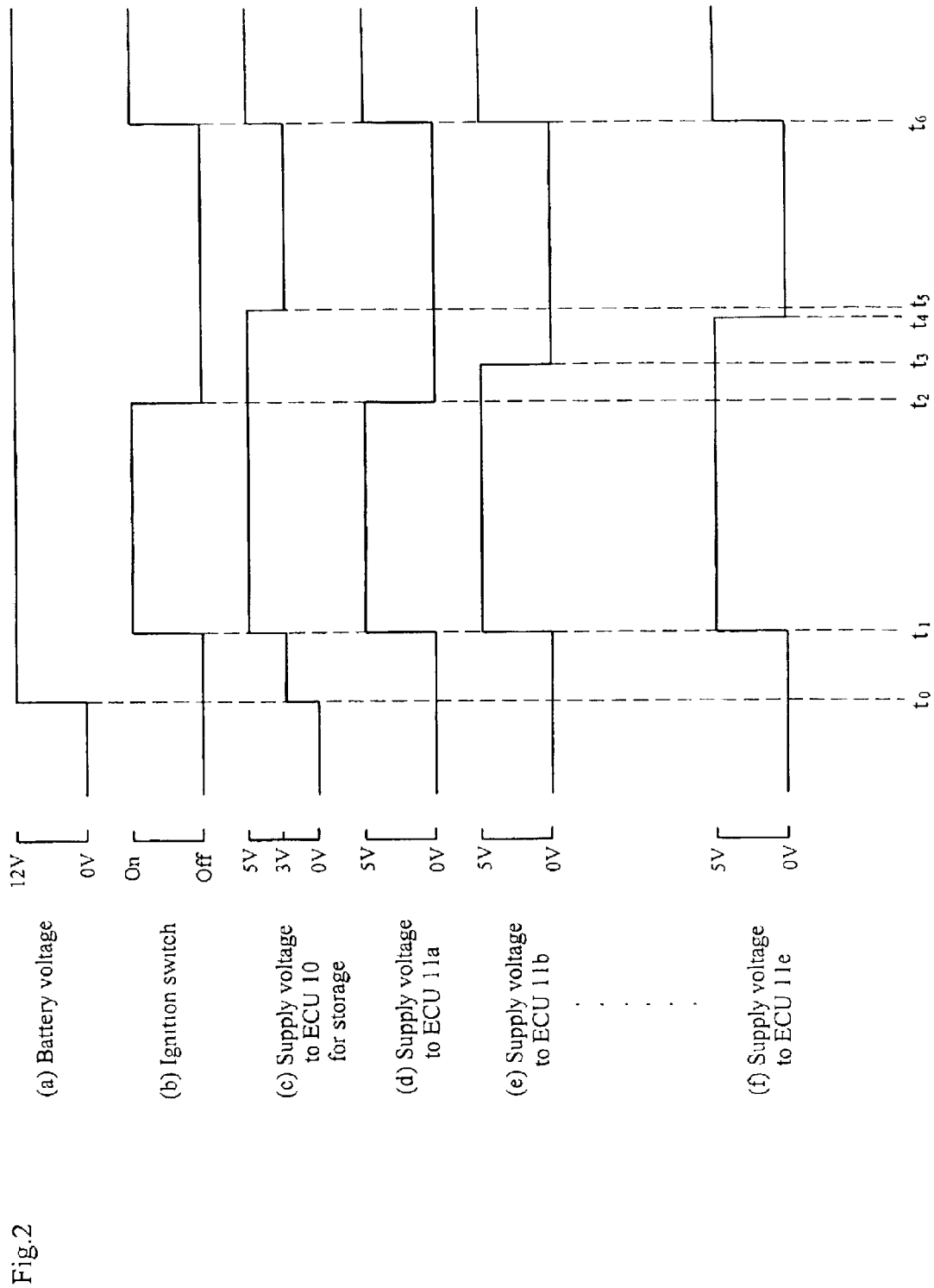
FIG. 2 is a timing chart for descriptions of how ECUs constituting the control system according to the embodiment (1) control the power supply voltage which varies by changing an ignition switch to the on/off position.

In FIG. 2, (a) shows the supply state of the battery power, (b) shows the timing of changing the ignition switch 7 to the on/off position, (c) shows changes in supply voltage to the microcomputer 13 of the ECU for storage 10, while (d)–(f) show changes in supply voltage to the microcomputers 14, . . . of the other ECUs 11a–11e, respectively.

When the ignition switch 7 is changed from the off position to the on position at a time $t_1$, a voltage of 5V is supplied through each power circuit 5 to each power terminal 9c, 9d, . . . of the microcomputer 13 of the ECU for storage 10 and the microcomputer 14, . . . of the other ECUs 11a–11e, respectively, from the battery 8.

At this time, in the ECU for storage 10, data required for control of each of the ECUs 11a–11e stored in the RAM 13c of the microcomputer 13 is read and transmitted through the communication line 12 to each of the ECUs 11a–11e, being the data source. Each of the ECUs 11a–11e which received the data transmitted from the ECU for storage 10, stores the data in the RAM 14c, . . . of its own and performs normal computing using the stored data.

At a time $t_2$, when the ignition switch 7 is changed from the on position to the off position, each of the ECUs 11a–11e starts the transmission processing for transmitting the data stored in the RAM 14c, . . . of its own with avoiding collision of sending data to the ECU for storage 10, according to a prescribed access method.

First, the ECU 11a transmits data stored in the RAM 14c to the ECU for storage 10, and after the transmission is completed, the relay switch 7a is turned off to reduce the supply voltage to the power terminal 9d of the microcomputer 14 to 0V. Following that, the ECU 11b transmits data stored in its RAM to the ECU for storage 10, and at a time $t_3$ when the transmission is completed, its relay switch is turned off to reduce the supply voltage to the power terminal of its microcomputer to 0V. Similarly, the ECU 11c and the ECU 11d transmit data stored in each RAM to the ECU for storage 10, and after the completion of the transmission, each relay switch is turned off to reduce the supply voltage to the power terminal of each microcomputer to 0V. And the remaining ECU 11e transmits data stored in its RAM to the ECU for storage 10, and at a time $t_4$ when the transmission is completed, its relay switch is turned off to reduce the supply voltage to the power terminal of its microcomputer to 0V.

In the ECU for storage 10, at a time $t_5$ when the writing of every data transmitted from each of the ECUs 11a–11e into the RAM 13c is completed, the relay switch 7a is turned off so as to reduce the supply voltage to the power terminal 9c of the microcomputer 13 from 5V to 3V, so that the data stored in the RAM 13c of the ECU for storage 10 is maintained using backup power.

Thus, in each of the ECUs 11a–11e, after the transmission of data to the ECU for storage 10 is completed, the relay switch 7a is turned off so as to reduce the supply voltage to the power terminal 9d, . . . of the microcomputer 14, . . . of its own to 0V. In the ECU for storage 10, since the main relay control for reducing the supply voltage to the power terminal 9c of the microcomputer 13 is performed after the reception of every data transmitted from each of the ECUs 11a–11e is completed, the data transmitted from each of the ECUs 11a–11e is properly received, resulting in improvements in reliability of the system.

And at a time $t_6$, when the ignition switch 7 is changed from the off position to the on position, as described above, in the ECU for storage 10, the supply voltage to the power terminal 9c of the microcomputer 13 is increased from a backup power of 3V to a normal voltage of 5V, the data from each of the ECUs 11a–11e stored in the RAM 13c is read out, and transmitted to each of the ECUs 11a–11e, being the data source, through the communication line 12. On the other hand, in each of the ECUs 11a–11e, the supply voltage to the power terminal 9d, . . . of each microcomputer 14, . . . is increased from 0V to 5V, and each ECU receives the data transmitted from the ECU for storage 10, stores the data in the RAM 14c, . . . of its own, and performs its normal computing using the stored data.

Figure 3:
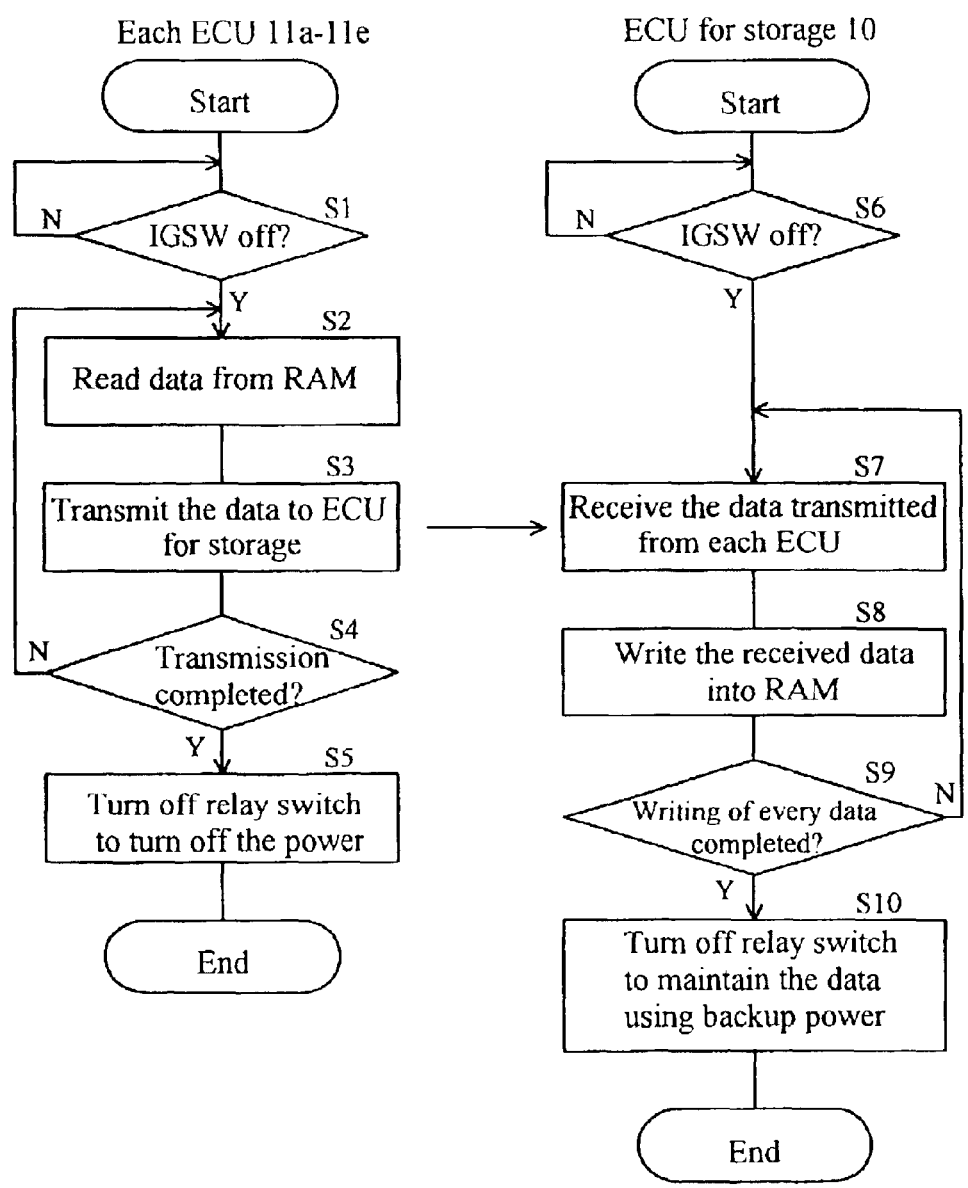
FIG. 3 is a flow chart showing the processing operations which microcomputers perform in the control system according to the embodiment (1)

The data transmission processing operation the microcomputer 14, . . . of each of the ECUs 11a–11e performs and the data storage processing operation the microcomputer 13 of the ECU for storage 10 performs when the ignition switch 7 is changed from the on position to the off position in the control system according to the embodiment (1), are described below by reference to a flow chart shown in FIG. 3.

Here, since the processing operations of the ECUs 11a–11e are basically the same except the different timings of sending/receiving data, only the processing operation the microcomputer 14 of the ECU 11a performs is described below.

In the ECU 11a, in Step 1, whether turning off of the ignition switch (hereinafter, referred to as IGSW) 7 is detected or not is judged. When turning off of the IGSW 7 is judged to have been detected, the operation proceeds to Step 2. On the other hand, when turning off of the IGSW 7 is judged not to have been detected, it returns to Step 1, wherein its normal processing is performed until turning off of the IGSW 7 is detected.

In Step 2, data such as learned values stored in a prescribed area of the RAM 14c, which need be maintained even after turning off of the IGSW 7 is read out, and the operation goes to Step 3. In Step 3, the transmission processing to the ECU for storage 10 to send the data for transmission, being the read-out data to which a source address and a destination address are added, into the communication line 12 is performed, and then it goes to Step 4.

In Step 4, whether the transmission of the data read from the RAM 14c is completed or not is judged. When the transmission is judged to have been completed, the operation goes to Step 5, wherein the relay switch 7a is turned off to turn off the power, so that the supply voltage to the power terminal 9d of the microcomputer 14 is reduced to 0V, leading to the end of the processing. The same processing is performed in each of the other ECUs 11b–11e, and after the data is transmitted to the ECU for storage 10, the relay switch is turned off to turn off the power, leading to the end of the processing.

Meanwhile, in the ECU for storage 10, in Step 6, whether turning off of the IGSW 7 is detected or not is judged. When turning off of the IGSW 7 is judged to have been detected, the operation goes to Step 7. On the other hand, when turning off of the IGSW 7 is judged not to have been detected, it returns to Step 6, wherein its normal processing is performed until turning off of the IGSW 7 is detected.

In Step 7, the reception processing of the data transmitted separately from each of the ECUs 11a–11e is performed, and the operation goes to Step 8. In Step 8, the writing of the received data of each of the ECUs 11a–11e into the RAM 13c is performed, and then it goes to Step 9. In Step 9, whether data to be transmitted from each of the ECUs 11a–11e is received and the writing of every data into the RAM 13c is completed or not is judged. When the reception of the data from each of the ECUs 11a–11e and the writing of every data into the RAM 13c are judged to have been completed, it goes to Step 10. On the other hand, when the reception of the data to be transmitted from each of the ECUs 11a–11e and the writing every data into the RAM 13c are judged not to have been completed in Step 9, it returns to Step 7, wherein the reception processing of data from any ECU the data of which is not yet written is performed.

In Step 10, the relay switch 7a is turned off so as to reduce the supply voltage to the power terminal 9c of the microcomputer 13 from 5V to 3V, so that the data stored in the RAM 13c is maintained using electricity supplied through the backup power line 9b from the battery 8.

The data transmission processing operation the microcomputer 13 of the ECU for storage 10 performs and the data reception processing operation the microcomputer 14, . . . of each of the ECUs 11a–11e performs when the IGSW 7 is changed from the off position to the on position in the control system according to the embodiment (1) are described below by reference to a flow chart shown in FIG. 4.

In the ECU for storage 10, in Step 11, whether turning on of the IGSW 7 is detected or not is judged. When turning on of the IGSW 7 is judged to have been detected, the operation proceeds to Step 12, wherein the relay switch 7a is turned on so as to perform the reading of the data of each of the ECUs 11a–11e stored in the RAM 13c, and then the operation goes to Step 13.

On the other hand, when turning on of the IGSW 7 is judged not to have been detected in Step 11, the operation returns to Step 11, wherein maintaining of the data using backup power is continued until turning on of the IGSW 7 is detected.

In Step 13, by sending the data for transmission, being the read-out data of each of the ECUs 11a–11e to which each source address and each destination address are added, into the communication line 12, the transmission processing of the data to each of the ECUs 11a–11e, being the data source, is performed, and the operation goes to Step 14.

In Step 14, whether the transmission of every data to each of the ECUs 11a–11e is completed or not is judged. When the transmission of every data to each of the ECUs 11a–11e is judged to have been completed, the operation goes to Step 15, wherein its normal processing is performed. On the other hand, when the transmission of every data to each of the ECUs 11a–11e is judged not to have been completed, it returns to Step 12, wherein the transmission processing of data is repeated until the transmission of every data to each of the ECUs 11a–11e is completed.

Meanwhile, in the ECU 11a, whether tuning on of the IGSW 7 is detected or not is judged in Step 16. When turning on of the IGSW 7 is judged to have been detected, the relay switch 7a is turned on, and the operation goes to Step 17, wherein the reception processing of the data transmitted from the ECU for storage 10 is performed, and then it goes to Step 18.

In Step 18, the received data is written into the RAM 14c, and then the operation goes to Step 19, wherein its normal processing is performed using the data written in the RAM 14c. Likewise in the other ECUs 11b–11e, after the reception processing and the writing processing of the data transmitted from the ECU for storage 10 are performed, the operation shifts to its normal processing.

Using the control system according to the embodiment (1), in each of the ECUs 11a–11e, after turning off of the IGSW 7 is detected and the transmission of the data stored in each RAM 14c, . . . to the ECU for storage 10 is completed, the relay switch 7a is turned off so as to stop the power supply to each microcomputer 14, . . . . Therefore, each of the ECUs 11a–11e need not change the power to the backup power to maintain the data stored in the RAM 14c, . . . , so that the electric current consumption in each of the ECUs 11a–11e can be reduced to zero. Moreover, in the ECU for storage 10, when turning off of the IGSW 7 is detected, the power is changed to the backup power after the completion of storing the data transmitted from each of the ECUs 11a–11e. Therefore, the data can be properly stored in the RAM 13c.

When turning on of the IGSW 7 is detected, the data stored in the RAM 13c in the ECU for storage 10 is transmitted to each of the ECUs 11a–11e, being the data source, so that each of the ECUs 11a–11e receives the data and can return to its normal processing condition as the IGSW 7 is turned on.

By utilizing the vehicular LAN system wherein data can be shared between the ECU for storage 10 and each of the ECUs 11a–11e, data which needs to be maintained during the off state of the IGSW 7 is transmitted to the ECU for storage 10 when the IGSW 7 is turned off, every piece of data is stored in the ECU for storage 10, and then the power supply to each of the ECUs 11a–11e can be stopped. As a result, the electric current consumption during the off state of the IGSW 7 in the overall system including each of the ECUs 11a–11e and the ECU for storage 10 can be considerably reduced, and the power consumption of backup power can be considerably reduced, resulting in effective prevention of the occurrence of a dead battery.

Here, in the control system according to the above embodiment (1), a single ECU for storage 10 is arranged in the control system 1A, but in another embodiment, another ECU for storage may be arranged in the control system for the purpose of backup of data. As a result of arranging multiple ECUs for storage in the control system like this, even when the data cannot be read out because of the occurrence of something defective in an ECU for storage to be main, each of the ECUs 11a–11e can be properly resumed to its normal processing condition by reading the data stored for backup in another ECU for storage as the IGSW 7 is turned on, resulting in improvements in reliability of the system.

In this case, as another ECU for storage, an ECU for EFI to perform engine control which is mounted on almost all of vehicles may be adopted. By using the ECU for EFI mounted on any vehicles as the ECU for storage, the specifications are made uniform without increasing the variety of system constructions, leading to holding down a rise in cost of the system construction.

A control system according to an embodiment (2) is described below. Here, since the hardware of the control system 1B according to the embodiment (2) is almost the same as that of the control system 1A shown in FIG. 1, different marks are affixed to only microcomputers having different functions for descriptions and the other components are not described below.

The difference of the control system according to the embodiment (2) from the control system according to the embodiment (1) is that, when an IGSW 7 is turned off, each of ECUs 21a–21e transmits data stored in each RAM 24c, . . . to an ECU for storage 20 multiple times, while the ECU for storage 20 receives the data transmitted multiple times, judges whether they are identical with one another or not, and stores the data in a RAM 23c when the data is judged to be the same.

Figure 5:
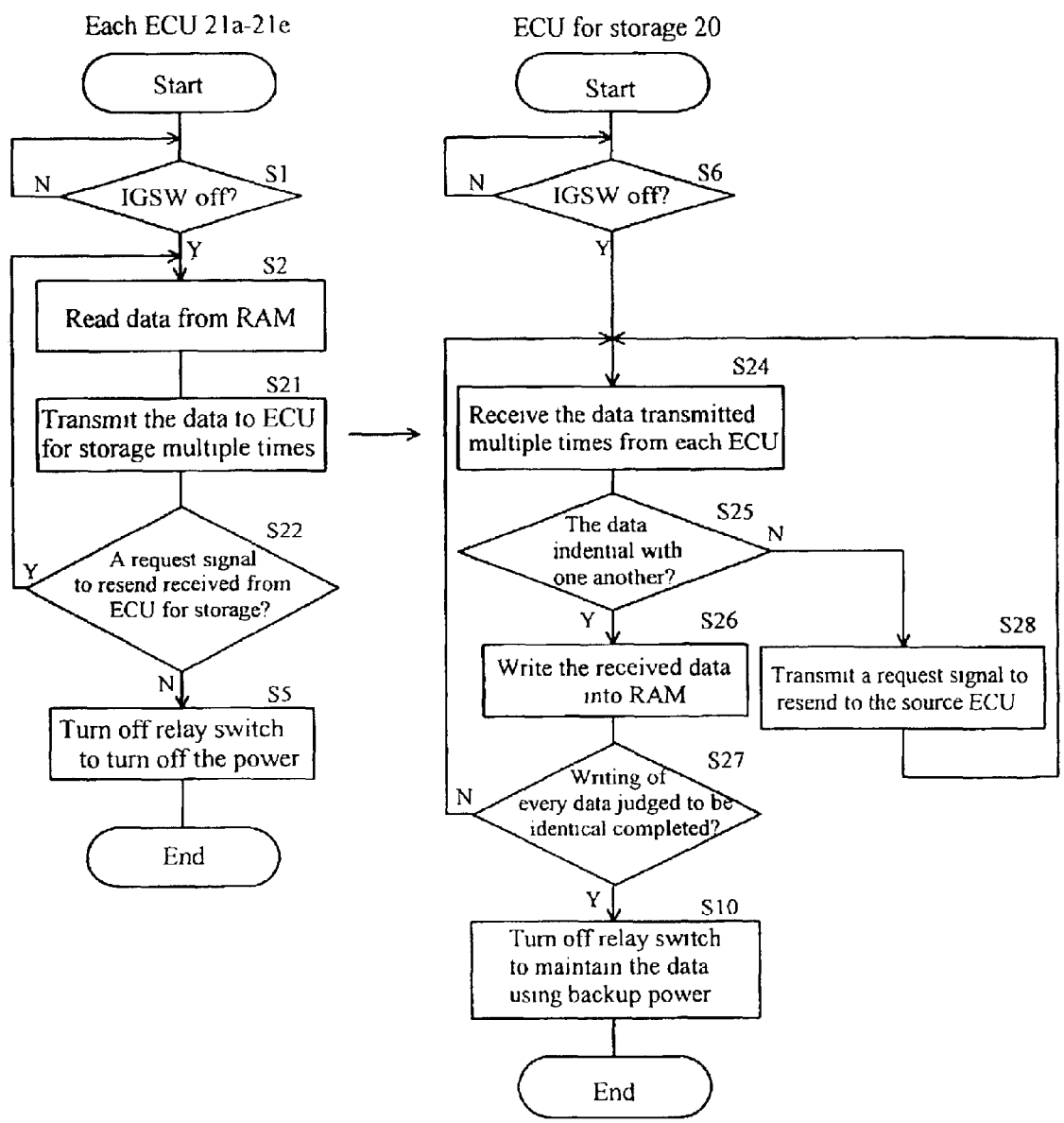
FIG. 5 is a flow chart showing the processing operations which microcomputers perform in a control system including ECUs according to an embodiment (2)

The data transmission processing operation a microcomputer 24, . . . of each of the ECUs 21a–21e performs and the data storage processing operation a microcomputer 23 of the ECU for storage 20 performs when the IGSW 7 is changed from the on position to the off position in the control system according to the embodiment (2) are described below by reference to a flow chart shown in FIG. 5. Here, the processing operations, being the same as those in the control system according to the embodiment (1) shown in FIG. 3, are similarly marked, which are not described.

Here, since the processing operations of the ECUs 21a–21e are basically the same except the different timings of sending/receiving data, only the processing operation the microcomputer 24 of the ECU 21a performs is described below.

In the ECU 21a, when turning off of the IGSW 7 is judged to have been detected in Step 1, the operation proceeds to Step 2, wherein data such as learned values which need be maintained even after the IGSW 7 is turned off, stored in a prescribed area of the RAM 24c is read out, and then it goes to Step 21. In Step 21, the transmission processing to the ECU for storage 20 wherein the data for transmission, being the read-out data to which a source address and a destination address are added, is sent into a communication line 12, is performed multiple times, and then it goes to Step 22.

In Step 22, whether a request signal to resend data is received from the ECU for storage 20 or not is judged. When a request signal to resend is judged not to have been received, the operation goes to Step 5, wherein a relay switch 7a is turned off to turn off the power, so as to reduce the supply voltage to a power terminal 9d of the microcomputer 24 to 0V, leading to the end of the processing.

On the other hand, when a request to resend is judged to have been received in Step 22, the operation returns to Step 2, wherein the data is read from the RAM 24c again, and the processing of transmitting the data multiple times is performed. Likewise in the other ECUs 21b–21e, if a request signal to resend is not received after data is read from its RAM and the read-out data is transmitted to the ECU for storage 20 multiple times, the relay switch 7a is turned off to turn off the power, leading to the end of the processing.

Meanwhile, in the ECU for storage 20, when turning off of the IGSW 7 is judged to have been detected in Step 6, the operation goes to Step 24, wherein the data transmitted multiple times separately from each of the ECUs 21a–21e through the communication line 12 are received, and then it goes to Step 25. In Step 25, whether the data transmitted multiple times separately from each of the ECUs 21a–21e are identical with one another or not is judged. When the multiple transmitted data are judged to be identical with one another, it goes to Step 26, wherein the writing processing of the received data of each of the ECUs 21a–21e into the RAM 23c is performed, and then it goes to Step 27.

On the other hand, when the data transmitted multiple times separately from each of the ECUs 21a–21e are judged not to be identical with one another in Step 25, the operation goes to Step 28, wherein a request signal to resend for requesting the transmission of the data again is sent to the ECU of the data source, and then it returns to Step 24, wherein the reception processing of the data is performed.

In Step 27, data to be transmitted multiple times from each of the ECUs 21a–21e is received, and whether the writing of every data judged to be the same into the RAM 23c is completed or not is judged. When the data to be transmitted multiple times from each of the ECUs 21a–21e is received, and the writing of every data judged to be the same into the RAM 23c is judged to have been completed, it goes to Step 10.

On the other hand, when the data to be transmitted from each of the ECUs 21a–21e is received, and the writing of every data judged to be the same into the RAM 23c is judged not to have been completed in Step 27, the operation returns to Step 24, wherein the reception processing of data transmitted multiple times from any ECU the data of which is not yet written is performed.

In Step 10, the relay switch 7a is turned off, so as to reduce the supply voltage to the power terminal 9c of the microcomputer 23 from 5V to 3V, and the data stored in the RAM 23c is maintained using electricity supplied through the backup power line from the battery 8.

Here, since the data transmission processing operation the microcomputer 23 of the ECU for storage 20 performs and the data reception processing operation the microcomputer of each of the ECUs 21a–21e performs when the IGSW 7 is changed from the off position to the on position, can be performed similarly to the processing in the control system according to the embodiment (1) shown in FIG. 4, they are not described below.

Using the control system according to the embodiment (2), when the IGSW 7 is turned off, the data of each of the ECUs 21a–21e is transmitted multiple times to the ECU for storage 20. In the ECU for storage 20, whether the multiple transmitted data from each of the ECUs 21a–21e are identical with one another or not is judged. When each of the data is judged to be the same, the data is stored in the RAM 23c, so that the data of each of the ECUs 21a–21e is maintained using backup power.

Therefore, it is possible to prevent the data in which an abnormal condition was caused by an abnormal communication, garbled data due to noise superposition or the like from being stored in the RAM 23c of the ECU for storage 20. As a result, when turning on of the IGSW 7 is detected, the ECU for storage 20 can transmit the data with accuracy to each of the ECUs 21a–21e and allow each of the ECUs 21a–21e to properly return to its normal processing condition as the IGSW 7 is turned on, resulting in improvements in the reliability of the system.

A control system according to an embodiment (3) is described below. Here, since the hardware of the control system 1C according to the embodiment (3) is almost the same as that of the control system 1A shown in FIG. 1, different marks are affixed to only microcomputers having different functions for descriptions, and the other components are not described below.

The difference of the control system according to the embodiment (3) from the control system according to the embodiment (1) is that the transmission of data kept in storage in a RAM 34c, . . . of each of ECUs 31a–31e to an ECU for storage 30 is performed not only when turning off of an IGSW 7 is detected, but also periodically during the on state of the IGSW 7.

Figure 6:
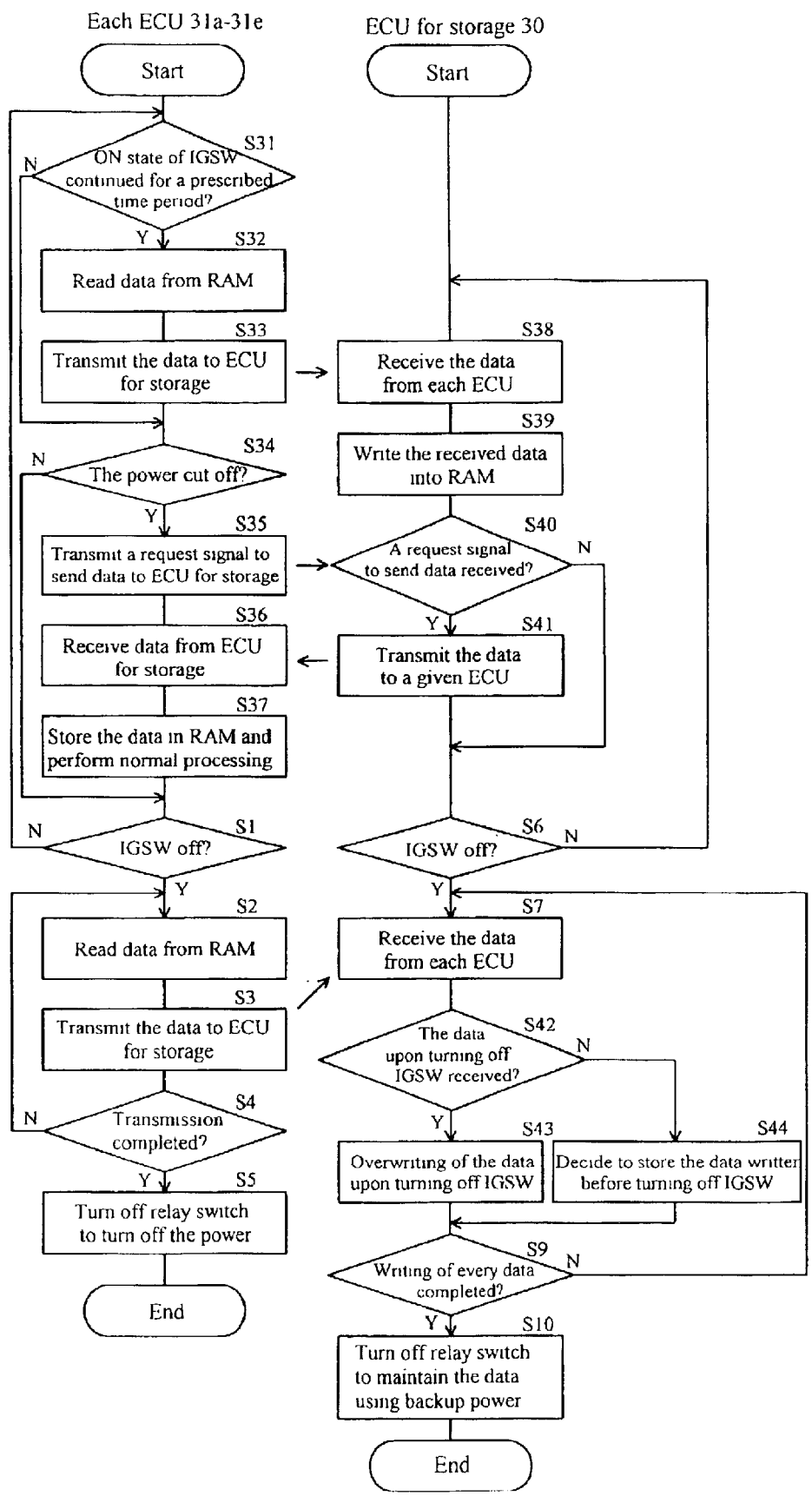
FIG. 6 is a flow chart showing the processing operations which microcomputers perform in a control system including ECUs according to an embodiment (3)

In the control system according to the embodiment (3), the data transmission processing operation a microcomputer 34, . . . of each of the ECUs 31a–31e performs and the data storage processing operation a microcomputer 33 of the ECU for storage 30 performs when the IGSW 7 is changed from the on state into the off state, are described by reference to a flow chart shown in FIG. 6. Here, the processing operations, being the same as those in the control system according to the embodiment (1) shown in FIG. 3, are similarly marked, which are not described below.

Here, since the processing operations of the ECUs 31a–31e are basically the same except the different timings of sending/receiving data, only the processing operation the microcomputer 34 of the ECU 31a performs is described below.

In the ECU 31a, in Step 31, whether the on state of the IGSW 7 has continued for a prescribed period of time or not is judged. When the on state of the IGSW 7 is judged to have continued for the prescribed period of time in Step 31, the operation goes to Step 32, wherein data such as learned values kept in storage in a prescribed area of the RAM 34c is read out, and then it goes to Step 33. In Step 33, the transmission processing to the ECU for storage 30 wherein the data for transmission, being the read-out data to which a source address and a destination address are added, is sent into a communication line 12 is performed, and then it goes to Step 34. On the other hand, when the on state of the IGSW 7 is judged not to have continued for the prescribed period of time in Step 31, it goes to Step 34.

In Step 34, whether or not the power was cut off because of some problem in a power circuit 5 or the like is judged. When the power is judged to have been cut off, the operation goes to Step 35, wherein a request signal to send data is transmitted to the ECU for storage 30, and it goes to Step 36.

In Step 36, the data transmitted from the ECU for storage 30 which had been transmitted before the power cutoff is received, and then the operation goes to Step 37, wherein the data is stored in the RAM 34c, its normal processing condition before the power cutoff is resumed so as to perform its normal processing, and it goes to Step 1.

In Step 1, whether turning off of the IGSW 7 is detected or not is judged. When turning off of the IGSW 7 is judged not to have been detected, the operation returns to Step 31, wherein whether the prescribed period of time has passed or not is judged, and the processing of transmitting the data to the ECU for storage 30 at established intervals is repeated until turning off of the IGSW 7 is detected.

On the other hand, when turning off of the IGSW 7 is judged to have been detected in Step 1, the operation goes to Step 2 and the following steps, wherein the same processing is performed as described in the control system according to the embodiment (1). The same processing is also performed in the other ECUs 31b–31e. The data is transmitted to the ECU for storage 30 after the on state of the IGSW 7 continued for the prescribed period of time, and when something abnormal such as power cutoff is detected, the data which had transmitted from the ECU for storage 30 before the power cutoff is received, and its normal condition before the power cutoff is resumed so as to perform its normal processing.

Meanwhile, in the ECU for storage 30, in Step 38, the data transmitted from each of the ECUs 31a–31e during the on state of the IGSW 7 is received through the communication line 12, and then the operation goes to Step 39. In Step 39, the received data of each of the ECUs 31a–31e is written into the RAM 33c, and it goes to Step 40.

In Step 40, whether a request signal to send data is received from any of the ECUs 31a–31e or not is judged. When a request signal to send data is judged to have been received, the operation goes to Step 41, wherein the data of a given ECU which sent the request signal to send data is read from the RAM 33c and transmitted to the given ECU, and then it goes to Step 6.

On the other hand, when a request signal to send data is judged not to have been received in Step 40, the operation goes to Step 6. In Step 6, whether turning off of the IGSW 7 is detected or not is judged. When turning off of the IGSW 7 is judged not to have been detected, it returns to Step 38, wherein the data transmitted from each of the ECUs 31a–31e periodically after the on state of the IGSW 7 continued for a prescribed period of time is received.

On the other hand, when turning off of the IGSW 7 is judged to have been detected in Step 6, the operation goes to Step 7, wherein the data transmitted from each of the ECUs 31a–31e when the IGSW 7 is turned off is received, and then it goes to Step 42.

In Step 42, whether the data upon turning off the IGSW 7 is received from each of the ECUs 31a–31e or not is judged. When the data upon turning off the IGSW 7 is judged to have been received, the operation goes to Step 43, wherein the data transmitted upon turning off the IGSW 7 is written over the data before turning off the IGSW 7 which has been already written in a prescribed area of the RAM 33c, and then it goes to Step 9.

On the other hand, when the data to be transmitted after turning off of the IGSW 7 is detected is judged not to have been received in Step 42, the operation goes to Step 44, wherein it is determined that the data which has been written before the IGSW 7 is turned off should be stored in place of the data transmitted after the IGSW 7 is turned off, and then it goes to Step 9.

In Step 9, whether the writing of every data of the ECUs 31a–31e into the RAM 33c is completed or not is judged. When the writing of every data of the ECUs 31a–31e is judged not to have been completed in Step 9, the operation returns to Step 7, wherein data from any ECU from which data has not been received is received.

On the other hand, when the writing of every data of the ECUs 31a–31e into the RAM 33c is judged to have been completed in Step 9, the operation goes to Step 10, wherein a relay switch 7a is turned off so as to reduce the supply voltage to a power terminal 9c of the microcomputer 33 from 5V to 3V, so that the data kept in storage in the RAM 33c is maintained using electricity supplied through a backup power line from a battery 8.

Figure 4:
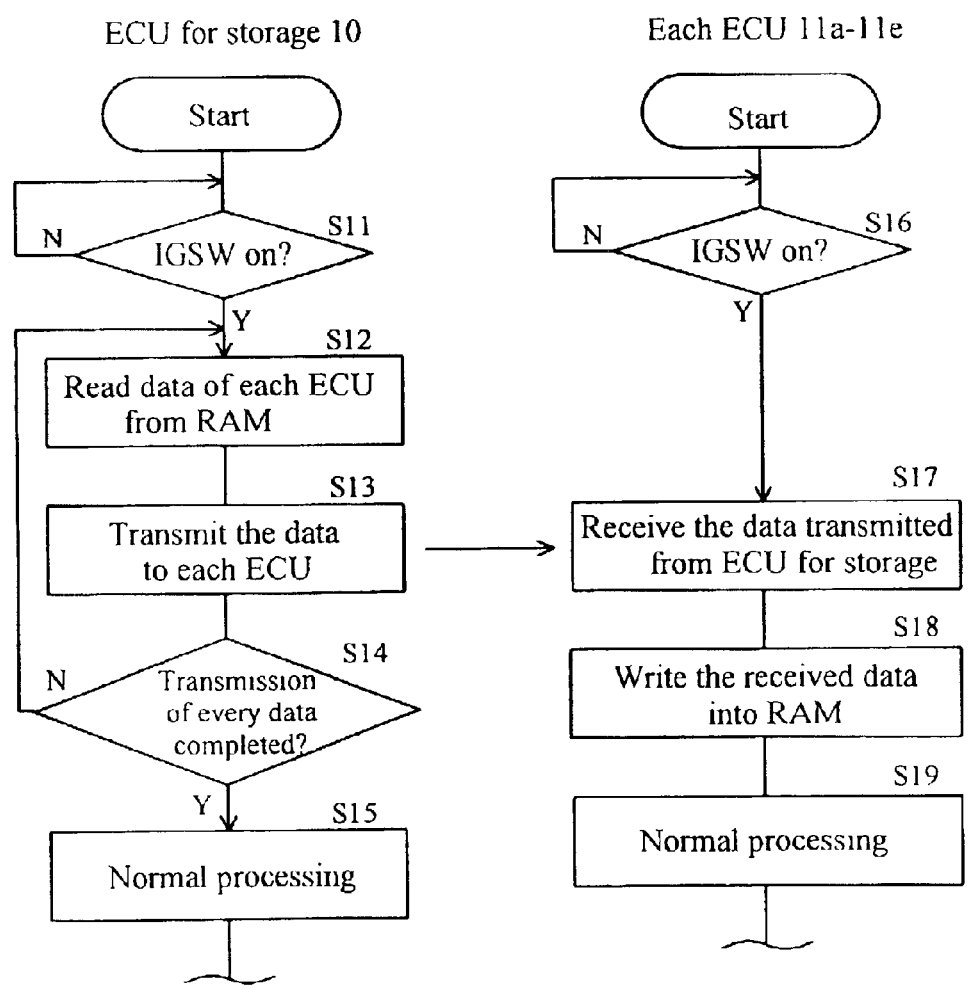
FIG. 4 is a flow chart showing the processing operations which microcomputers perform in the control system according to the embodiment (1)

Since the data transmission processing operation the microcomputer 33 of the ECU for storage 30 performs and the data reception processing the microcomputer 34, . . . of each of the ECUs 31a–31e performs when the IGSW 7 is changed from the off position to the on position, can be performed similarly to the processing in the control system according to the embodiment (1) shown in FIG. 4, they are not described here.

Using the control system according to the embodiment (3), during the on state of the IGSW 7, data is transmitted periodically from each of the ECUs 31a–31e to the ECU for storage 30. Therefore, even if the power is cut off during usual processing and the data kept in storage in a RAM of any of the ECUs 31a–31e is lost, the data which had been transmitted periodically to the ECU for storage 30 before the abnormal condition occurred can be captured from the ECU for storage 30 for use, so that each of the ECUs 31a–31e can be allowed to swiftly return to its normal processing condition just before the occurrence of the abnormal condition.

And in the ECU for storage 30, even if data to be transmitted from each of the ECUs 31a–31e after the IGSW 7 is turned off cannot be received, the data which had been received before turning off the IGSW 7 can be stored in place thereof. Therefore, when the IGSW 7 is turned on the next time, the ECU which could not receive the data after turning off the IGSW 7 can swiftly return to its normal processing condition during the on state of the IGSW 7 by receiving the data stored in place thereof, resulting in improvements in reliability of the system.

Figure 7:
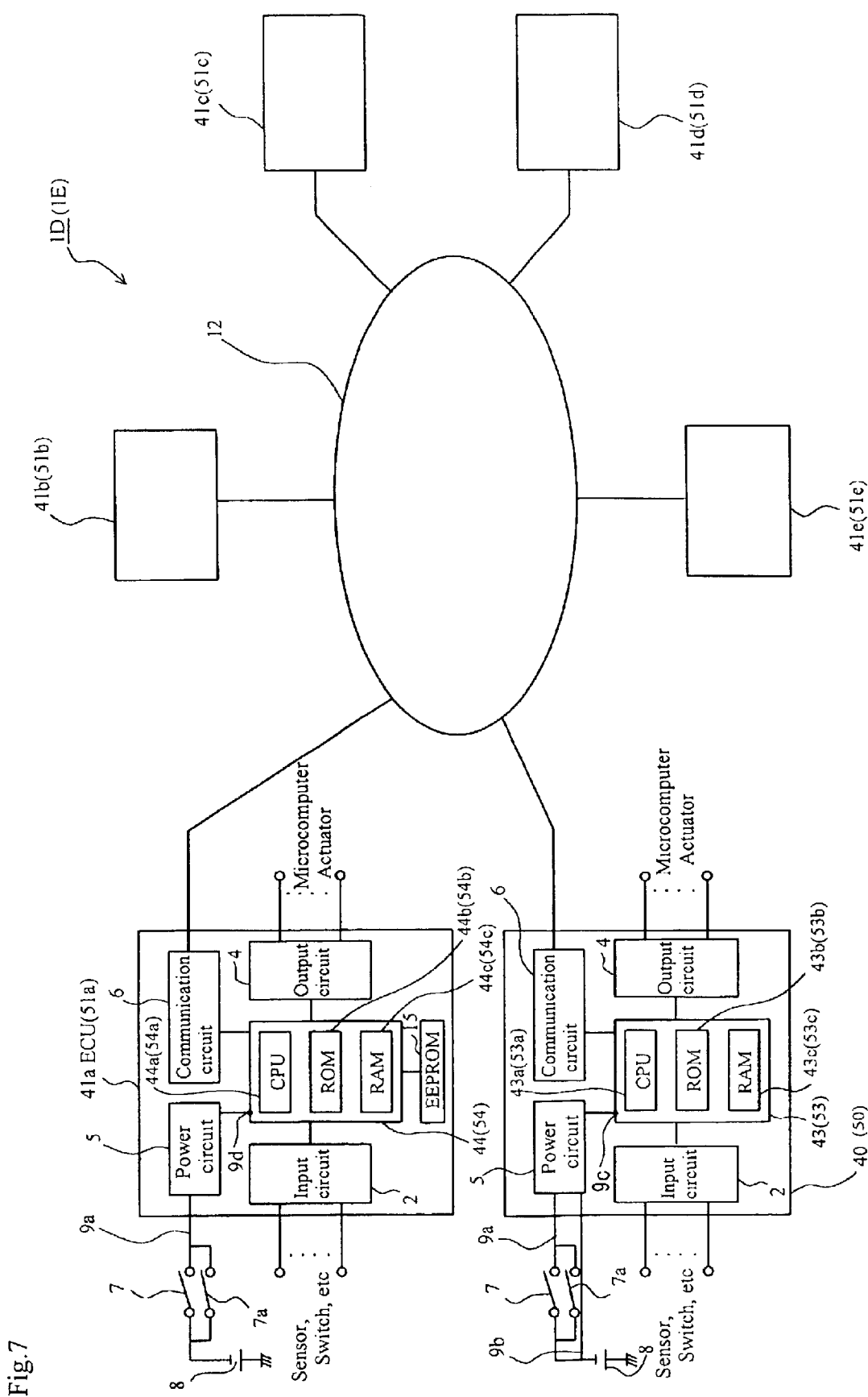
FIG. 7 is a block diagram schematically showing the construction of a control system including ECUs according to an embodiment (4)

A control system according to an embodiment (4) is described below. FIG. 7 is a block diagram schematically showing the principal part of the control system 1D according to the embodiment (4). Here, the components, being the same as those in the control system 1A shown in FIG. 1, are similarly marked, which are not described below.

The difference from the control system 1A shown in FIG. 1 is that an EEPROM 15, . . . , being a nonvolatile memory whereby data is not destroyed even after cutoff of the power supply, is connected to a microcomputer 44, . . . of each of ECUs 41a–41e, respectively. Since the hardware except that point is almost the same as that of the control system 1A shown in FIG. 1, different marks are affixed to only the microcomputers having different functions for descriptions, and the other components are not described here.

Figure 8:
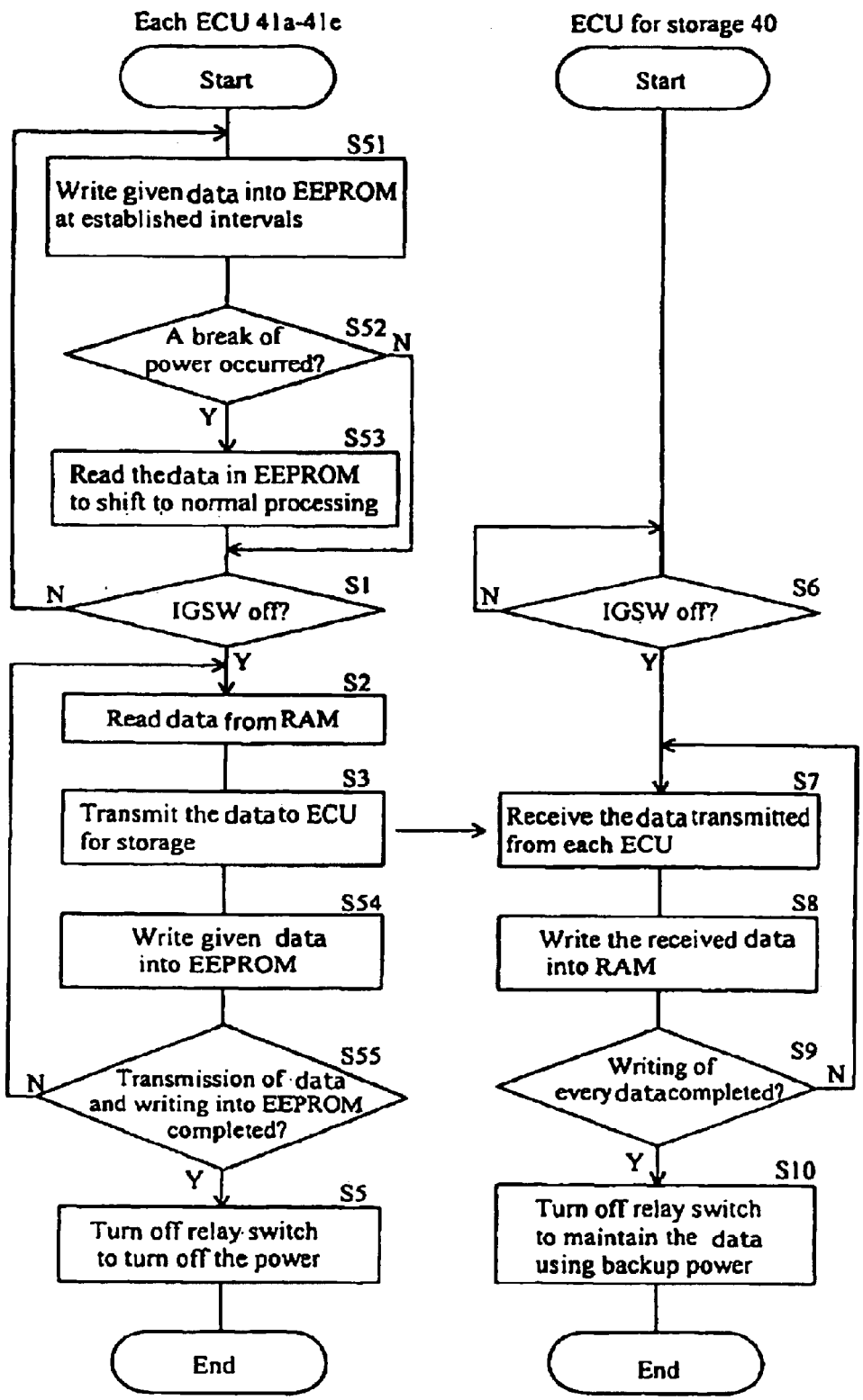
FIG. 8 is a flow chart showing the processing operations which microcomputers perform in a control system according to the embodiment (4)

In the control system according to the embodiment (4), the transmission processing operation of controlling data the microcomputer 44, . . . of each of the ECUs 41a–41e performs and the data storage processing operation the microcomputer 43 of the ECU for storage 40 performs when an IGSW 7 is changed from the on state to the off state are described by reference to a flow chart shown in FIG. 8. Here, the processing operations, being the same as those in the control system according to the embodiment (1) shown in FIGS. 3 and 4, are similarly marked, which are not described below.

Here, since the processing operations of the ECUs 41a–41e are basically the same except the different timings of sending/receiving data, only the processing operation the microcomputer 44 of the ECU 41a performs is described below.

In the ECU 41a, in Step 51, given data having a high importance among the data stored in a RAM 44c is written into the EEPROM 15 at established time intervals, and the operation goes to Step 52. In Step 52, whether a break of power was caused by something defective or not is judged. When a break of power is judged to have been caused in Step 52, it goes to Step 53, wherein the data stored in the EEPROM 15 is read out as the data for resumption, and the processing shifts to its normal one, and then it goes to Step 1. On the other hand, when a break of power is judged not to have been caused in Step 52, it goes to Step 1.

In Step 1, whether turning off of the IGSW 7 is detected or not is judged. When turning off of the IGSW 7 is judged not to have been detected, the operation returns to Step 51, wherein the writing of given data into the EEPROM 15 is repeated. On the other hand, when turning off of the IGSW 7 is judged to have been detected in Step 1, it goes to Step 2, wherein the data is read from the RAM 44c. In the following Step 3, the data read from the RAM 44c is transmitted to the ECU for storage 40, and then it goes to Step 54.

In Step 54, the given data read from the RAM 44c is written into the EEPROM 15, and then the operation goes to Step 55. Here, as for the writing of data into the EEPROM 15, for example, IDs or the like which show priorities are previously added to the data and the writing of a minimum of important data required for control can be performed according to the priorities so that the writing can be started from the data having a higher importance regarding control depending on the storage capacity of the EEPROM 15.

In Step 55, whether the transmission of data to the ECU for storage 40 and the writing of data into the EEPROM 15 are completed or not is judged. When the transmission of data to the ECU for storage 40 and the writing of data into the EEPROM 15 are judged to have been completed, the operation goes to Step 5, wherein a relay switch 7a is turned off so as to turn off the power, so that the supply voltage to a power terminal 9d of the microcomputer 44 is reduced to 0V, leading to the end of the processing.

On the other hand, when the transmission of data to the ECU for storage 40 and the writing of data into the EEPROM 15 are judged not to have been completed in Step 55, the operation returns to Step 2, wherein data is read from the RAM 44c and the transmission of the data to the ECU for storage 40 and the writing of the data into the EEPROM 15 are performed.

Here, since the data storage processing operation the microcomputer 43 of the ECU for storage 40 performs is similar to the processing of Steps 6–10 in the control system according to the embodiment (1) shown in FIG. 3, it is not described below.

Figure 9:
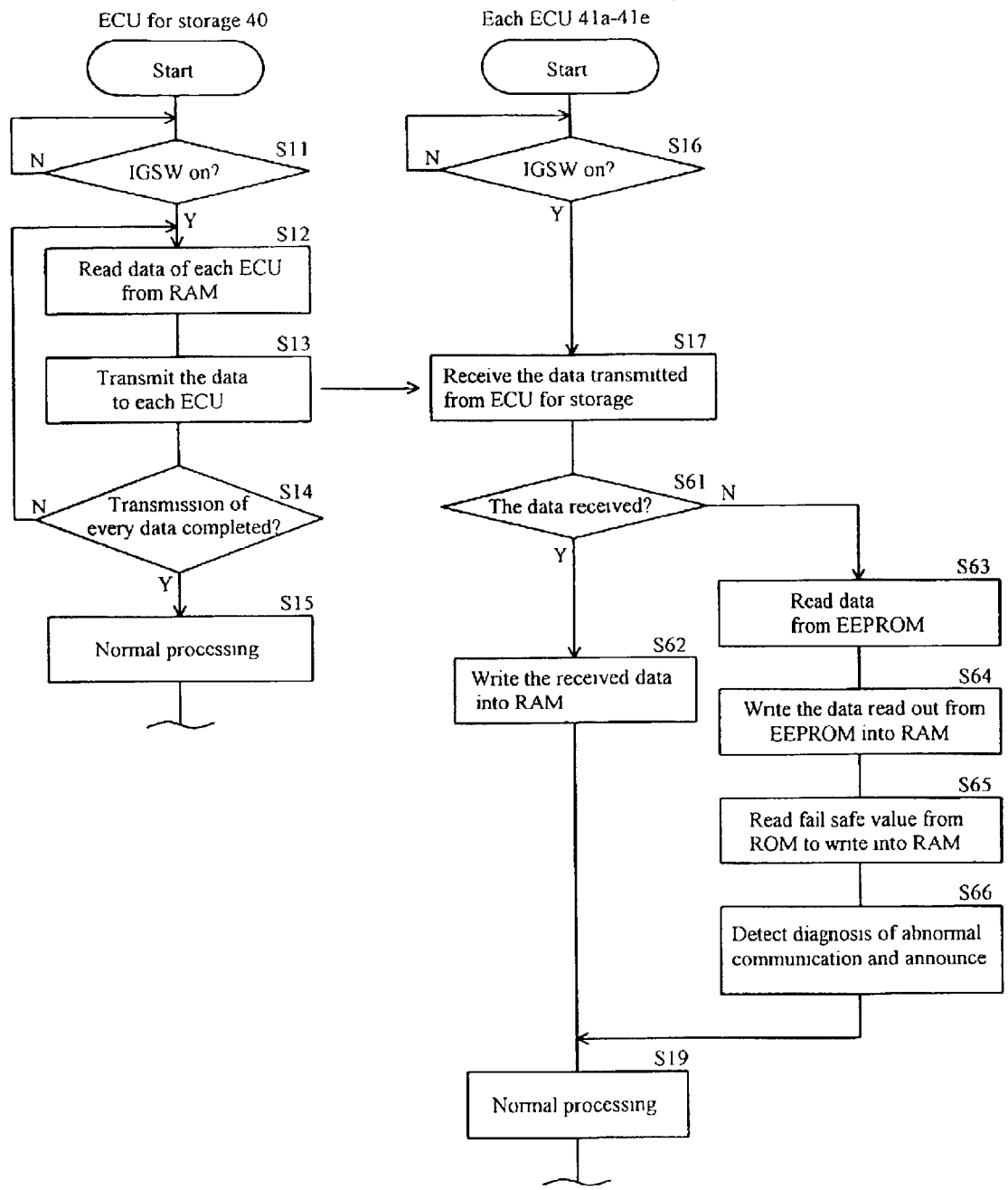
FIG. 9 is a flow chart showing the processing operations which microcomputers perform in a control system according to the embodiment (4)

The data transmission processing operation the microcomputer 43 of the ECU for storage 40 performs and the data reception processing operation the microcomputer 44, . . . of each of the ECUs 41a–41e performs when the IGSW 7 is changed from the off position to the on position are described by reference to a flow chart shown in FIG. 9.

Since the data transmission processing operation the microcomputer 43 of the ECU for storage 40 performs is similar to the processing of Steps 11–15 in the control system according to the embodiment (1) shown in FIG. 4, it is not described here.

In the ECU 41a, in Step 16, whether turning on of the IGSW 7 is detected or not is judged. When turning on of the IGSW 7 is judged to have been detected, the operation goes to Step 17.

In Step 17, the reception processing of data to be transmitted from the ECU for storage 40 is performed, and then the operation goes to Step 61. In Step 61, whether the data to be transmitted from the ECU for storage 40 is received or not is judged. When the data is judged to have been received, it goes to Step 62, wherein the data transmitted from the ECU for storage 40 is written into the RAM 44c, and next it goes to Step 19, wherein the operation shifts to its normal processing using the data written in the RAM 44c.

On the other hand, when the data to be transmitted from the ECU for storage 40 is judged not to have been received in Step 61, the operation goes to Step 63, wherein the data kept in storage in the EEPROM 15 is read out, and then it goes to Step 64.

In Step 64, the data read from the EEPROM 15 is written into the RAM 44c, and then the operation goes to Step 65. In Step 65, concerning data which has not been stored in the EEPROM 15, data which has been previously stored as fail safe values is read from a ROM 44b and the data which has not been stored in the EEPROM 15 is written into the RAM 44c, and then it goes to Step 66.

The data as the fail safe values stored in the ROM 44b is the data not of the initial values but of estimated values set on the assumption that the data is updated through a measure of learning processing, which has been stored as the data more suitable for control than the initial values.

In Step 66, a diagnosis of abnormal communication with the ECU for storage 40 is detected, and as the contents defective are stored in the EEPROM 15, the announcement processing for letting the driver know the abnormal communication such as lighting a warning light for announcing an abnormal condition within the instrument panel is performed, and then the operation goes to Step 19. In Step 19, the processing shifts to its normal one using the data read from the EEPROM 15 and the data of the fail safe values read from the ROM 44b.

Using the control system according to the embodiment (4), even when data to be transmitted from the ECU for storage 40 cannot be received, in each of the ECUs 41a–41e, by reading a minimum of data required for normal control stored in each EEPROM 15, . . . , the control can be continued without resuming the control based on the initial values. As for data which has not been written in each EEPROM 15, . . . , prescribed values previously stored as fail safe values in each ROM 44b, . . . can be read out and used for control. Therefore, even if the memory capacity of each EEPROM 15, . . . is small, the processing can swiftly return to its normal processing condition just before the occurrence of the abnormal condition by substituting the fail safe values suitable for control, resulting in improvements in reliability of the system.

When an abnormal condition occurs in the communication state between each of the ECUs 41a–41e and the ECU for storage 40, it is possible to announce it by lighting a warning indicator light, a warning announcement or the like, leading to the performance of an early inspection.

A control system according to an embodiment (5) is described below. Here, since the hardware of the control system IE according to the embodiment (5) is almost the same as that of the control system 1D shown in FIG. 7, different marks are affixed to only microcomputers having different functions for descriptions, and the other components are not described below.

The difference of the control system according to the embodiment (5) from the control system according to the embodiment (4) is that, when an IGSW 7 is turned on, in each of ECUs 51a–51e, whether the data read from an EEPROM 15 and the data transmitted from an ECU for storage 50 match with each other or not is judged, and that when they do not match with each other, the data read from the EEPROM 15 is used for control.

Figure 10:
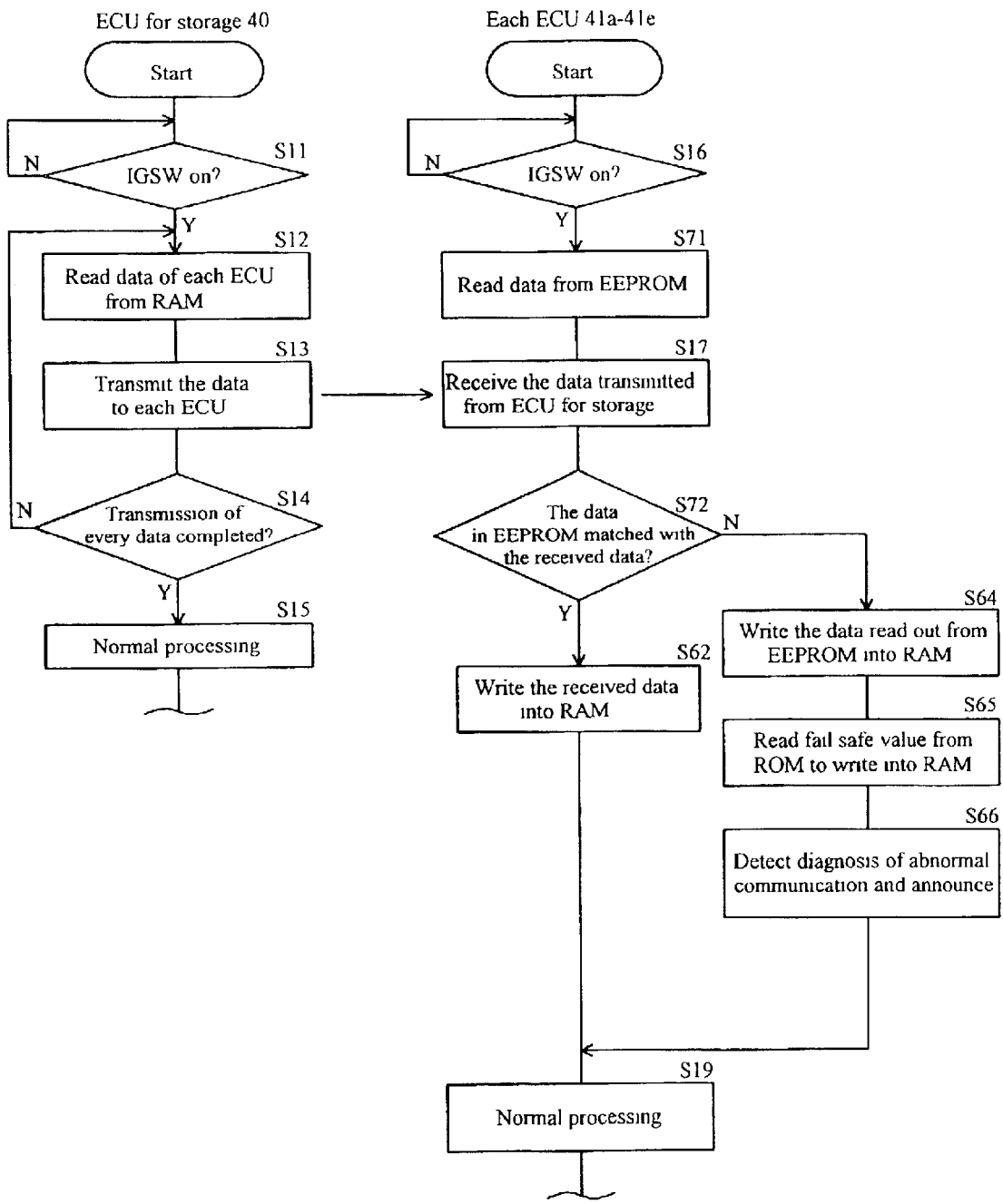
FIG. 10 is a flow chart showing the processing operations which microcomputers perform in a control system including ECUs according to an embodiment (5)
Figure 11:
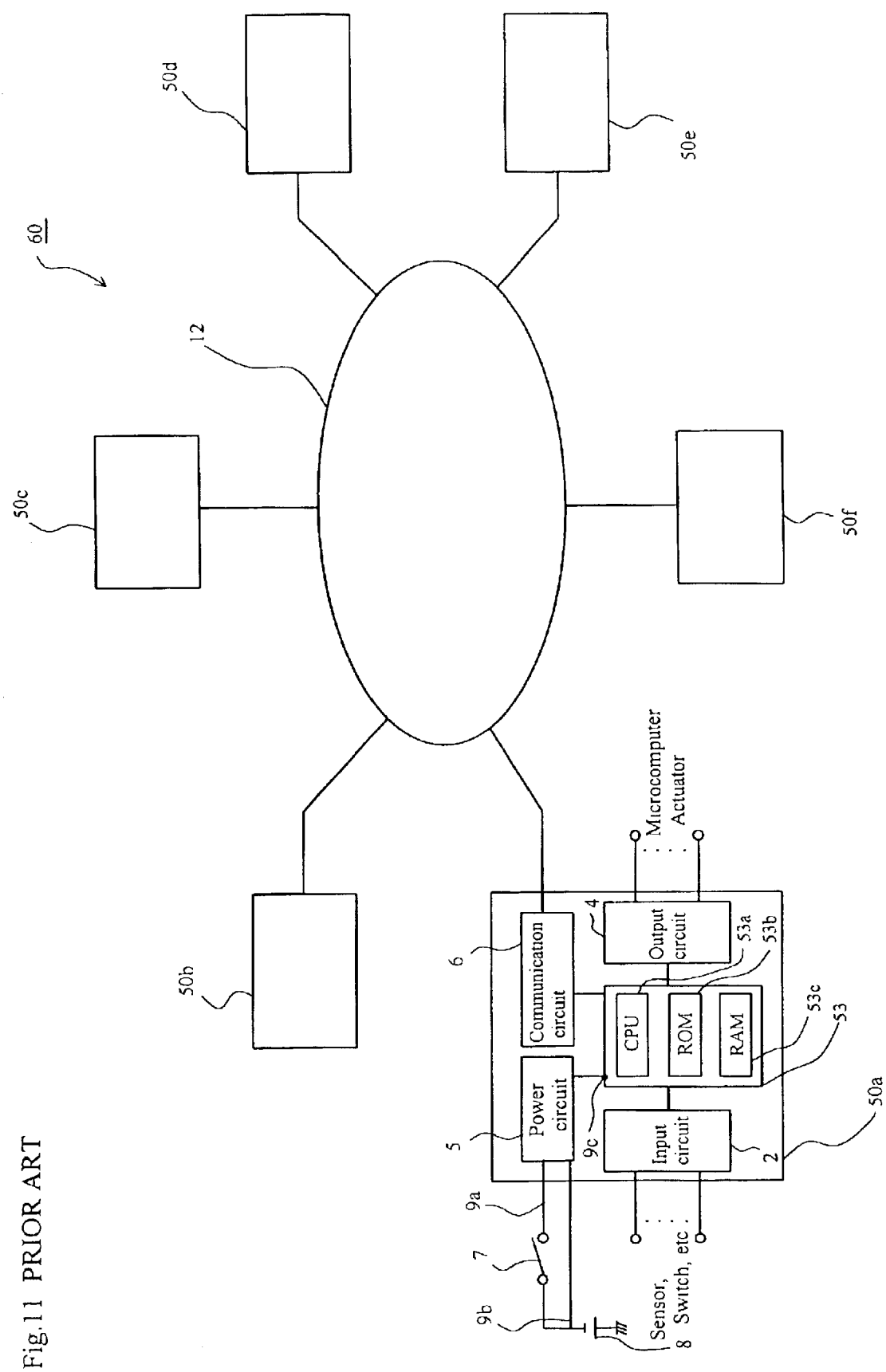
FIG. 11 is a block diagram schematically showing the construction of a control system including conventional ECUs.

In the control system according to the embodiment (5), the data reception processing operation a microcomputer 54, . . . of each of the ECUs 51a–51e performs when the IGSW 7 is changed from the off position to the on position is described below by reference to a flow chart shown in FIG. 10. Here, the processing operations, being the same as those in the control system according to the embodiment (4) shown in FIG. 9, are similarly marked, which are not described below.

Here, since the processing operations of the ECUs 51a–51e are basically the same processing operations except the different timings of sending/receiving data, only the processing operation the microcomputer 54 of the ECU 51a performs is described below.

In the ECU 51a, in Step 16, whether turning on of the IGSW 7 is detected or not is judged. When turning on of the IGSW 7 is judged to have been detected, the operation goes to Step 71, wherein data stored in the EEPROM 15 is read out, and then it goes to Step 17. In Step 17, data to be transmitted from the ECU for storage 50 is received, and then it goes to Step 72.

In Step 72, whether the data read from the EEPROM 15 matches with the data transmitted from the ECU for storage 50 or not is judged. When the data read from the EEPROM 15 and the data transmitted from the ECU for storage 50 are judged to match with each other, the operation goes to Step 62, wherein the data transmitted from the ECU for storage 50 is written into the RAM 54c, and then it goes to Step 19, wherein the operation shifts to its normal processing using the data written into the RAM 54c.

On the other hand, when the data read from the EEPROM 15 and the data transmitted from the ECU for storage 50 are judged not to match with each other, the operation goes to Step 64.

In Step 64, the data read from the EEPROM 15 is written into the RAM 54c, and next the operation goes to Step 65, wherein the data previously stored as fail safe values is read from the ROM 54b, and the data which has not been stored in the EEPROM 15 is written into the RAM 54c, and then it goes to Step 66.

In Step 66, the diagnosis of abnormal communication with the ECU for storage 50 is detected, and as the contents defective are stored in the EEPROM 15, the announcement processing for letting the driver know the abnormal communication is performed, and then the operation goes to Step 19. In Step 19, using the data read from the EEPROM 15 and the data of the fail safe values read from the ROM 54b, the operation shifts to its normal processing.

Using the control system according to the embodiment (5), by judging whether the data read from each EEPROM 15, . . . and the data transmitted from the ECU for storage 50 match with each other or not, it is possible to easily decide whether the data transmitted from the ECU for storage 50 is in an abnormal condition or not, so that the use of the data in which an abnormal condition has occurred can be prevented. When they are judged not to match with each other, each of the ECUs 51a–51e can swiftly return to its normal processing condition just before the occurrence of the abnormal condition by using the data read from each EEPROM 15, . . . and the data read from the ROM 54b.

Here, as the control system according to each above embodiment, the vehicular LAN system wherein ECUs are connected through a communication line 12 is exemplified, but it is not limited to the vehicular LAN system, and it can be adopted in other systems, and can also be applied to a wireless LAN wherein ECUs are not connected through a communication line 12.

What is claimed is:

1. A control system comprising:

a first control unit operable to perform data communications; and a second control unit operable to perform data communications, wherein the first control unit and the second control unit share data with each other, wherein the first control unit comprises:

a first transmitter operable to transmit data to the second control unit when a position of a first switch connected to a power supply is detected as being changed to an off position; and a power supply cutoff circuit operable to cut off the power supply to the first control unit after the transmission of the data to the second control unit by the first transmitter is completed, and wherein the second control unit comprises:

a first storage controller operable to store the data transmitted from the first control unit in a first storage unit; and a power switching circuit operable to detect a change of the first switch to the off position and to switch the power of the second control unit to backup power.

2. A control system according to claim 1, wherein the first control unit further comprises a first receiver operable to receive data transmitted from the second control unit when a change of the first switch to an on position is detected, and wherein the second control unit further comprises a second transmitter operable to transmit the data stored in the first storage unit to the first control unit, the second control unit being a source of the data, when a change of the first switch to the on position is detected.

3. A control system according to claim 1, comprising a plurality of the first control units.

4. A control system according to claim 1, comprising a plurality of the second control units.

5. A control system according to claim 1, wherein the first transmitter in the first control unit transmits the data to the second control unit multiple times, wherein the second control unit further comprises a data identifying unit operable to judge whether or not the multiple transmitted data from the first control unit are identical with one another, and wherein the first storage controller stores the data in the first storage unit when the data identifying unit judges the multiple transmitted data to be identical with one another.

6. A control system according to claim 1, wherein the first transmitter in the first control unit transmits the data periodically to the second control unit when the first switch is in an on position.

7. A control system according to claim 1, wherein the first control unit further comprises:

a second storage unit, being nonvolatile, which can maintain data even if power is not provided;

a second storage controller operable to store only a minimum of data required for normal control of the first control unit in the second storage unit; and a data reading unit operable to read the data stored in the second storage unit.

8. A control system according to claim 7, wherein the data reading unit in the first control unit reads the data from the second storage unit when data to be transmitted from the second control unit, upon the first switch being changed to an on position, cannot be received, and wherein the first control unit further comprises a first data controller operable to use the data read from the second storage unit by the data reading unit for control.

9. A control system according to claim 8, wherein the first control unit further comprises a first announcing unit operable to announce the occurrence of an abnormal condition when data to be transmitted from the second control unit, upon the first switch being changed to the on position, cannot be received.

10. A control system according to claim 8, wherein the first control unit further comprises an alternative data reading unit operable to read a prescribed value stored as a fail safe value when data which is not kept in storage in the second storage unit is required for control.

11. A control system according to claim 7, wherein the data reading unit in the first control unit reads the data from the second storage unit upon the first switch being changed to the on position;

wherein the first control unit further comprises:

a data match judging unit operable to judge whether or not the data read from the second storage unit by the data reading unit matches with the data transmitted from the second control unit; and a second data controller operable to use the data read from the second storage unit for control when the data read from the second storage unit and the data transmitted from the second control unit are judged not to match with each other by the data match judging unit.

12. A control system according to claim 11, wherein the first control unit further comprises a second announcing unit operable to announce the occurrence of an abnormal condition when the data match judging unit determines that the data read from the second storage unit does not match the data transmitted from the second control unit.

13. A control system according to claim 1, being mounted on a vehicle, wherein the second control unit is an ECU for body control or an ECU for security.

14. A control system according to claim 13, being mounted on a vehicle, wherein, when a plurality of the second control units are arranged, an ECU for engine control is included in the second control units.

15. A control system, wherein multiple control units can mutually perform data communications, comprising:

at least one control units among the multiple control units, having a nonvolatile storage unit which can maintain therein a memory contents using backup power, wherein control units of the multiple control units, other than the at least one control unit, transmit the memory contents to the at least one control unit having the nonvolatile storage unit when a power supply to the system is shut off.

* * * * *